No. 832,092. PATENTED OCT. 2, 1906.
F. R. SPEAR.
BRAKE SHOE.
APPLICATION FILED OCT. 20, 1905.
2 SHEETS—SHEET 1.
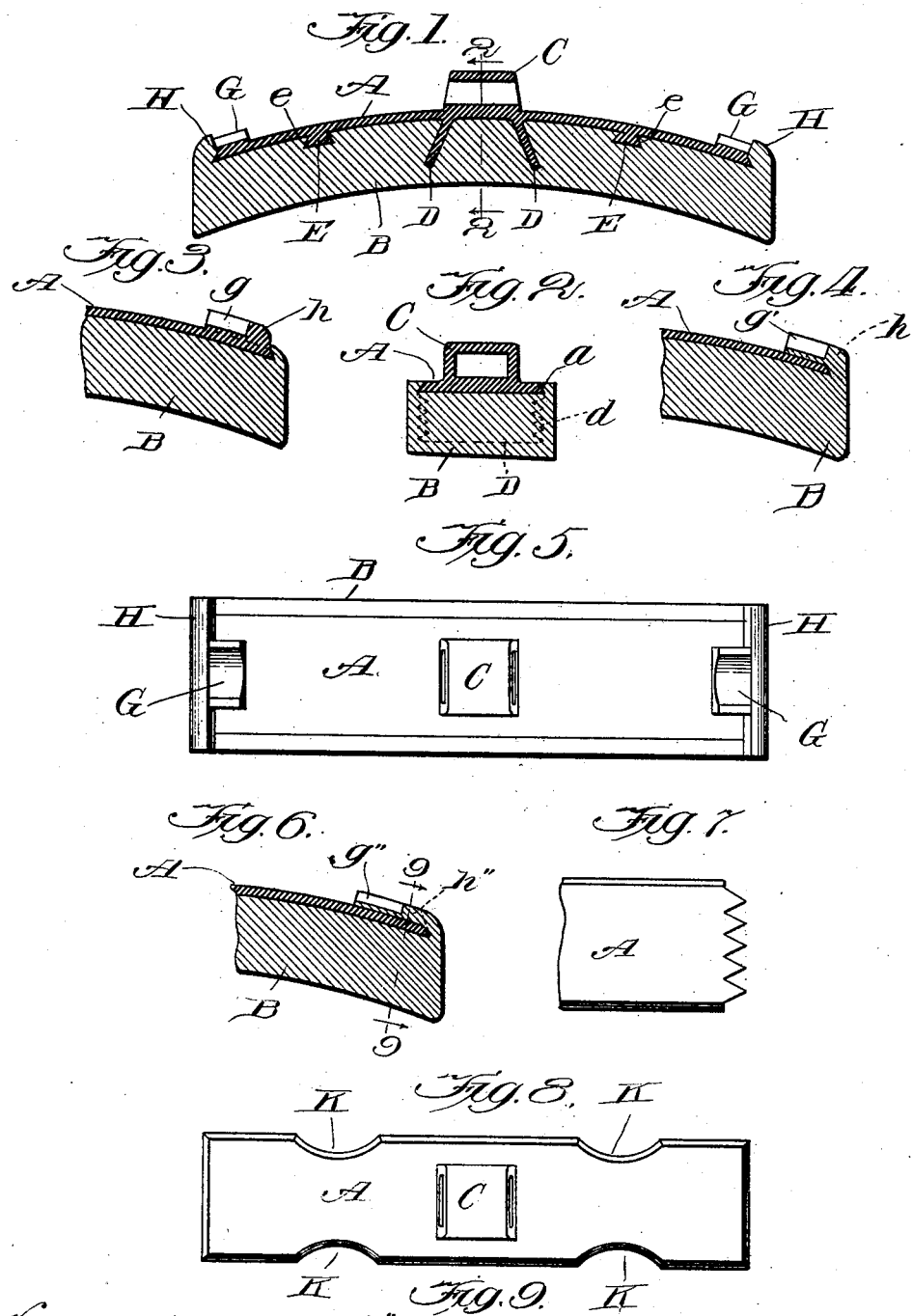
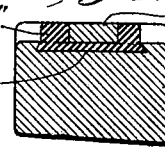

No. 832,092. PATENTED OCT. 2, 1906.
F. R. SPEAR.
BRAKE SHOE.
APPLICATION FILED OCT. 20, 1905.
2 SHEETS—SHEET 2.
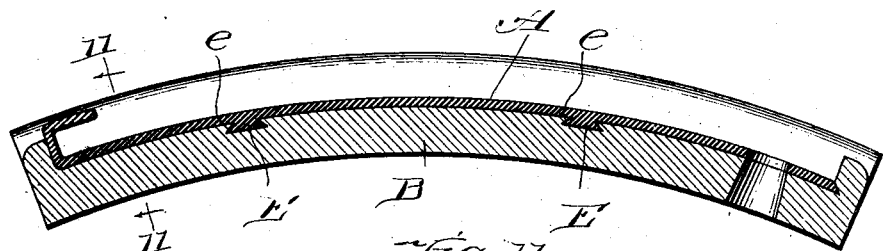
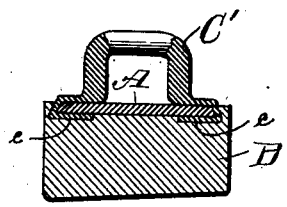
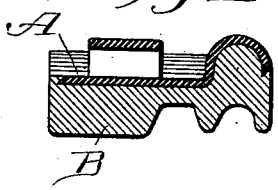
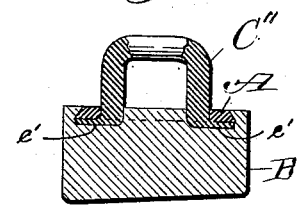
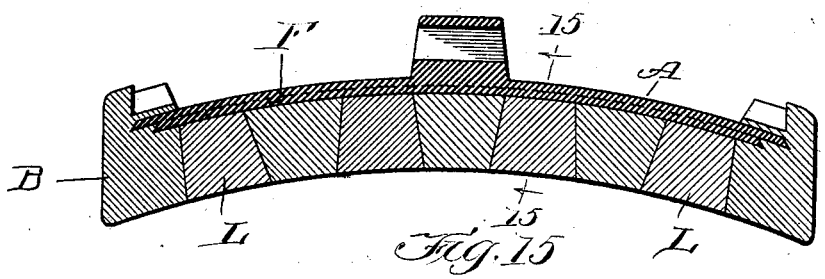
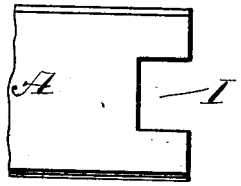
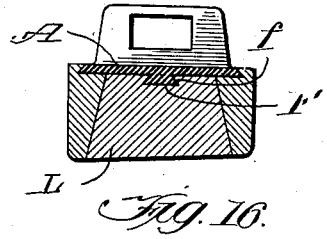
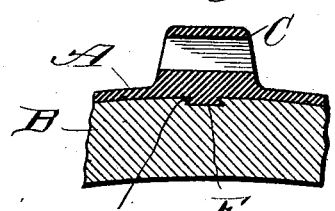
Witnesses:
H. S. Gaither
M. A. Kiddie
Inventor:
Frank R. Spear
by Wm. F. Belt
atty

UNITED STATES PATENT OFFICE.

FRANK R. SPEAR, OF CHICAGO, ILLINOIS.

BRAKE-SHOE.

No. 832,092.　　Specification of Letters Patent.　　Patented Oct. 2, 1906.

Application filed October 20, 1905. Serial No. 283,680.

*To all whom it may concern:*

Be it known that I, FRANK R. SPEAR, a citizen of the United States, residing at Chicago, in the county of Cook and State of Illinois, have invented new and useful Improvements in Brake-Shoes, of which the following is a specification.

The object of this invention is to reinforce and strengthen a brake-shoe by securing to the body at or adjacent to its back a cast malleable-iron plate or strip which will strengthen the body and hold the parts thereof together in case of fracture and which will cause no injury to the tire if it comes in contact therewith.

The invention can be embodied in carshoes and locomotive-driver shoes, both solid and composite, of all varieties, shapes, and sizes. In the drawings I have shown the invention embodied in a variety of ways in several kinds of shoes, which will be fully described.

In the accompanying drawings, Figure 1 is a longitudinal sectional view of a shoe embodying my invention with the attaching-lug and guide-lugs made integral with the plate. Fig. 2 is a sectional view on the line 2 2 of Fig. 1. Fig. 3 is a sectional view of one end of a shoe embodying my invention and showing the end lug and guide-lug both made integral with the plate. Fig. 4 is a similar view showing the end lug and guide-lug made integral with the body. Fig. 5 is a top plan view of the shoe shown in Fig. 1. Fig. 6 is a sectional view of an end of a shoe embodying the invention and showing the end lug integral with the plate and the guide-lug integral with the body. Fig. 7 shows the plate toothed at its ends. Fig. 8 is a plan view of the plate, showing it recessed at the edges. Fig. 9 is a sectional view on the line 9 9 of Fig. 6. Fig. 10 is a longitudinal sectional view of a locomotive-driver shoe embodying my invention. Fig. 11 is a sectional view on the line 11 11 of Fig. 10. Figs. 12 and 13 show the attaching-lug made separate from the plate. Fig. 14 is a longitudinal sectional view of a composite shoe embodying my invention. Fig. 15 is a sectional view on the line 15 15 of Fig. 14. Fig. 16 is a detail sectional view showing a transverse anchoring-rib on the plate. Figs. 17 and 18 show different ways of making the plate.

I employ a cast malleable-iron strengthening and reinforcing back plate A, which is securely locked to the body B of the shoe at or adjacent to its back. The plate is preferably made imperforate, and it can be conveniently locked to the body by making it of less length and width than the body and beveling its edges $a$ to make locking connection with the metal of the body, as shown in Fig. 2.

The attaching-lug C may be made integral with the plate, as shown in Figs. 1, 2, and elsewhere, or it can be made separate from the plate and connected therewith in a variety of ways. In Fig. 12 the ends $c$ of the attaching-lug C' are bent to inclose the side edges of the plate, and in Fig. 13 the ends $c'$ of the attaching-lug C'' pass through an opening in the plate and are turned out to engage the under side of the plate.

I may provide the plate with one or more tongues projecting angularly beneath the attaching-lug and embedded in the body of the shoe to more securely lock the plate to the body beneath the attaching-lug. In Fig. 1 I have shown the plate provided with two diverging tongues D, located below the attaching-lug and embedded in the body of the shoe; but any number of these tongues may be employed, and they may be distributed along the plate as desired. The side edges of the tongue may be provided with teeth $d$, Fig. 2, to interlock with the body metal. Instead of employing the tongues, or in conjunction therewith, I may provide the plate with one or more transverse locking-ribs E to be embedded in the body of the shoe and having beveled edges $e$ to make locking engagement with the body, Figs. 1, 10, 16, or I may employ a longitudinally-extending locking-rib F, having beveled edges $f$, Figs. 14, 15.

The guide-lugs G may be made integral with the plate and the end lugs H integral with the body, Fig. 1, the plate being shortened or recessed at its ends in any suitable manner to permit the body metal to flow up and form the end lugs, as shown. The end lug and the guide-lug at each end of the shoe may both be made integral with the plate, as indicated by $h$ and $g$, respectively, Fig. 3, or these lugs may both be made integral with the body, as indicated by $g'$ $h'$, Fig. 4, or the guide-lug may be made integral with the body and the end lug integral with the plate, as indicated by $g''$ $h''$, Figs. 6, 9. I may provide the end of the plate with a recess I, Fig. 17, or recess the corners, as indicated by J, Fig. 18, to permit the body metal to flow up above the plate and form the end or guide lugs, or both, as heretofore described; but ordinarily it will be sufficient merely to make the plate shorter than the body, as shown in Fig. 1.

The plate can be made with straight edges, Fig. 5, or it may be provided with a plurality of recesses K, Fig. 8, or otherwise indented along its sides and ends. As the plate is primarily a casting, it can be made in any desired shape and with the lugs in any form desired. The plate will be cast curved to conform to the curvature of the completed shoe. The body of the shoe may be solid, Figs. 1 to 10, or it may be of the composite type with inserts L, of any suitable form and material, therein, Figs. 14, 15.

I am aware that it is not broadly new to provide a brake-shoe with a strengthening-plate at or adjacent to its back; but these plates have heretofore been made of malleable iron, wrought iron, or steel and are stamped or cut and pressed into shape as distinguished from casting. While plates of these materials answer the purpose of strengthening the shoes, they are objectionable for the reason that they will injure a steel tire, and the shoes must therefore be removed from service before the body is worn down to the plate. In practice this cannot be done at the exact time it may become necessary, and ofttimes the shoe is hung so that it will wear more rapidly at one end than at the other. To be on the safe side and avoid liability of injuring a steel tire, the shoes are ordinarily removed from service while there still remains a considerable portion of the body in front of the plate. The worn shoe is then consigned to the scrap pile and represents a considerable loss. To overcome these and other disadvantages of the plates which have heretofore been used, I make the plate of cast malleable iron, which is a gray-iron casting subsequently annealed and distinguished from malleable iron, wrought iron, and steel, which are stamped or cut and pressed into shape. Cast malleable iron is a very desirable material for the purpose, as it is strong and durable and can be cast into any shape desired with the attaching-lug and also with the other lugs integral therewith. The plate can be provided with tongues D or ribs E F to lock the plate and body of the shoe together regardless of the fact that the tongues or ribs may sooner or later engage the tire of a wheel, for cast malleable iron will not injure a steel tire like steel and wrought-iron. The body of the shoe may be worn entirely away, and, indeed, the plate itself may be permitted to wear, for, as before stated, it will not break and will not injure the tire. The maximum degree of wear is thus obtainable from a shoe of this character, and conversely a minimum amount of metal is left for the scrap pile. If an attaching-lug separate from the plate is used, I prefer to make it of soft cast-steel, because soft cast-steel, like cast malleable iron, will not injure the tire and will not fracture in handling or in service.

What I claim, and desire to secure by Letters Patent, is—

1. A brake-shoe comprising a body and a cast malleable iron plate secured to the body at or adjacent to its back.

2. A brake-shoe comprising a body, a cast malleable iron plate secured to the body at or adjacent to its back, and a soft cast-steel attaching-lug.

3. A brake-shoe comprising a body, a cast malleable iron plate secured to the body at or adjacent to its back, and guide-lugs integral with the plate.

4. A brake-shoe comprising a body, a cast malleable iron plate secured to the body at or adjacent to its back, guide-lugs integral with the plate, and a soft cast-steel attaching-lug.

5. A brake-shoe comprising a body, a cast malleable iron plate secured to the body at or adjacent to its back, a soft cast-steel attaching-lug, guide-lugs integral with the plate, and end lugs integral with the body.

6. A brake-shoe comprising a body, a cast malleable iron plate secured to the body at or adjacent to its back, and a pair of diverging tongues projecting angularly into the body beneath the attaching-lug and cast integral with the plate.

7. A brake-shoe comprising a body, a cast malleable iron plate secured to the body at or adjacent to its back, and one or more tongues integral with the plate and embedded in the body, said tongues having toothed edges.

FRANK R. SPEAR.

Witnesses:
WM. O. BELT,
M. A. KIDDIE.